United States Patent [19]

Grimm

[11] 4,189,161
[45] Feb. 19, 1980

[54] BI-DIRECTIONAL RING GAP SEAL

[75] Inventor: Raymond L. Grimm, Grand Haven, Mich.

[73] Assignee: Muskegon Piston Ring Company, Muskegon, Mich.

[21] Appl. No.: 937,257

[22] Filed: Aug. 28, 1978

[51] Int. Cl.² .............................................. F16J 9/14
[52] U.S. Cl. ...................................... 277/221; 277/222
[58] Field of Search ......................... 277/216, 219–222, 277/27

[56] References Cited

U.S. PATENT DOCUMENTS

| 1,391,795 | 9/1921 | Safford | 277/221 |
| 1,397,334 | 11/1921 | Schmolinski | 277/221 X |
| 1,475,783 | 11/1923 | Behnke | 277/222 |
| 1,512,393 | 10/1924 | Behnke | 277/222 |
| 1,532,547 | 4/1925 | Pruyn | 277/222 |
| 2,080,935 | 5/1937 | Slyk | 277/222 |

FOREIGN PATENT DOCUMENTS

| 492080 | 9/1938 | United Kingdom | 277/221 |
| 854465 | 11/1960 | United Kingdom | 277/27 |

Primary Examiner—Robert S. Ward, Jr.
Attorney, Agent, or Firm—Price, Heneveld, Huizenga & Cooper

[57] ABSTRACT

A parted sealing ring having a gap includes inner and outer faces, upper and lower sides and a bi-directional ring joint defined by a parted annular body at the gap. The joint includes a pair of circumferentially projecting elements. The projecting elements define circumferentially offset, oppositely facing sealing surfaces. The sealing surfaces are inclined and converge towards the outer circumferential face of the ring. The sealing surfaces are also spaced axially apart at the outer circumferential face of the ring. The sealing surfaces of one end of the ring body seat against and form a seal with the oppositely facing sealing surfaces on the other end of the ring body when the gap in the ring is closed.

7 Claims, 9 Drawing Figures

U.S. Patent  Feb. 19, 1980  4,189,161
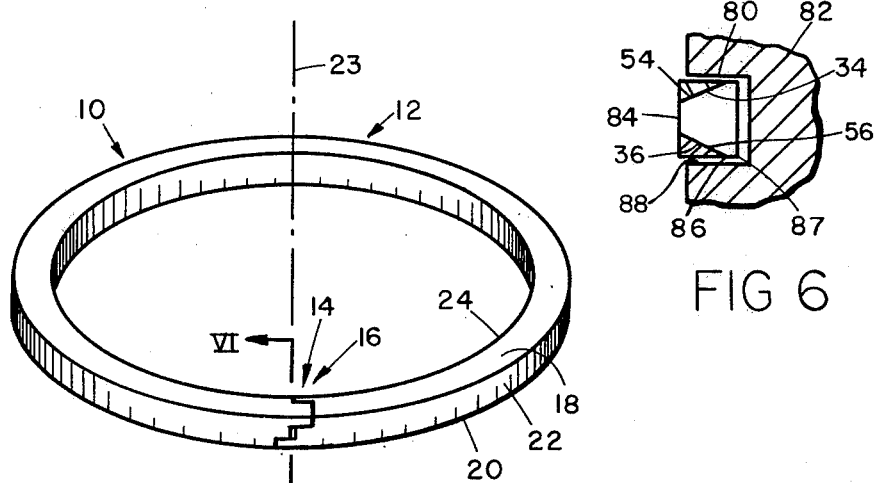
FIG 1
FIG 6
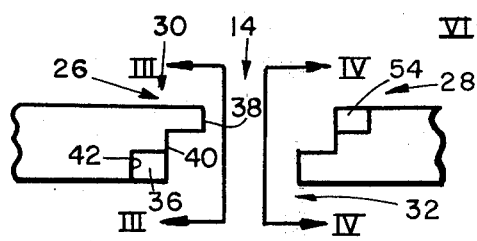
FIG 2
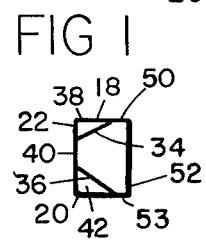
FIG 3
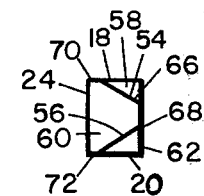
FIG 4
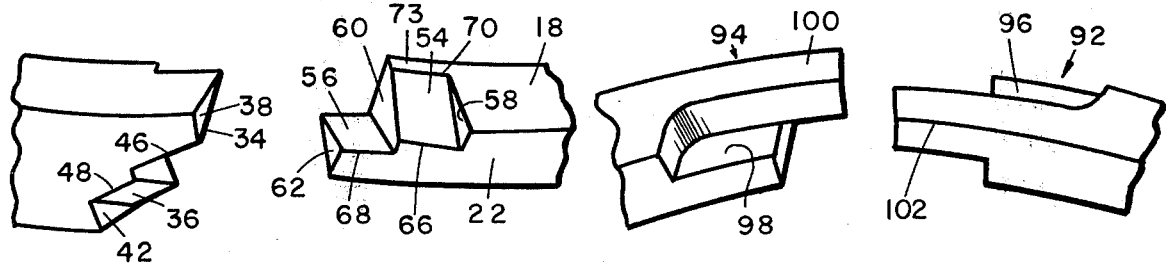
FIG 5
FIG 7 (PRIOR ART)
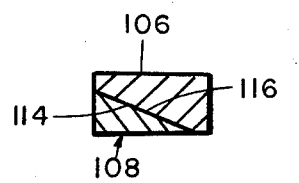
FIG 9 (PRIOR ART)
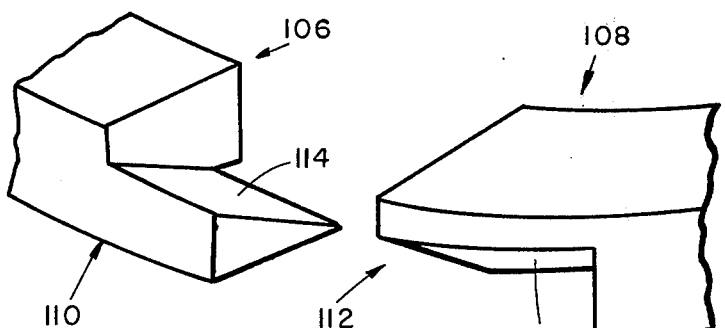
FIG 8 (PRIOR ART)

BI-DIRECTIONAL RING GAP SEAL

BACKGROUND OF THE INVENTION

The present invention relates to piston rings and more particularly to a piston ring joint or gap defined by the ends of a parted, annular piston ring body.

Heretofore, various proposals have been made for piston rings having a parted, annular body and defining an overlapping joint structure for sealing high pressure fluids from one or from either side. Piston rings of this type have found utility in diesel engines involving high compression ratios. The overlapping joint constructions attempt to reduce the blow-by or leakage past the rings in such applications. Bi-directional ring joints have also found utility in various forms of hydraulic equipment such as double or single acting rams and in high pressure compressors.

The piston rings of the type under consideration are received within compression ring grooves of the piston and define a sealing surface which bears against the cylinder wall and a sealing surface which bears on the bottom ring groove side. The resilience of the piston ring initially forces the ring into contact with the cylinder wall. Fluid under pressure acting on one of the sides of the piston ring may leak past the piston ring side and down the inner circumferential face of the ring into the piston ring groove and then through the joint. It may also leak axially of the piston through the ring part. The leakage problem is aggravated by the fact that the joint structure must be constructed to provide sufficient clearance for thermal expansion and to compensate for cylinder tolerances.

One form of high pressure compression ring which has heretofore been proposed includes a pair of projections extending circumferentially from the ends of the ring body. Each projection defines an angled sealing surface with the sealing surfaces being oppositely related so as to mate when the gap is closed and the projections are overlapped to define the joint. In this type of seal ring, the high pressure side projection of the joint may be pentagonal or triangular and the lower or bottom side projection of the joint is triangular. In order to effectively seal in double acting piston installations, half of the rings of this type are usually installed with the pressure side facing in one direction and the other half of the rings are installed with the pressure side facing in the opposite direction.

Another form of high pressure sealing ring presently available includes a projection extending circumferentially adjacent the inner, circumferential face of one end of the ring and a projection extending circumferentially adjacent the outer, circumferential face of the other end of the ring. The ends of the ring define horizontally disposed or radially extending sealing surfaces which overlap when the gap is closed. This form of ring provides a sealing surface between the joint and the cylinder wall, between the bottom side of the ring and the bottom ring groove side and between the horizontal disposed sealing surfaces, one of which is defined by a projection and the other of which is defined by a recess formed in the ends of the ring.

SUMMARY OF THE INVENTION

In accordance with the present invention, an improved one piece concentric sealing ring is provided having a bi-directional ring gap or joint resulting in increased sealing effectiveness and which is capable of being manufactured at a reduced cost. Essentially the bi-directional ring gap or joint of the sealing ring is defined by projections extending in opposed relationship from the ends of a parted annular body. Each of the projections defines a pair of oppositely inclined sealing surfaces which are circumferentially offset. The sealing surfaces defined by one of the projections face oppositely to the sealing surfaces defined by the other of the projections. When the projections overlap, the sealing surfaces seat against each other.

In narrower aspects of the invention, the sealing surfaces are angled so as to converge towards the outer circumferential face of the sealing ring and further extend radially between the inner face and outer face of the ring. The sealing surfaces are equally and oppositely angled with respect to a radially extending plane midway between the upper and lower sides of the ring and the outer circumferential end portions of the sealing surface are offset axially of the body.

The bi-directional joint construction in accordance with the preferred embodiment of the present invention defines a plurality of sealing surfaces or seals when installed in a piston ring groove. A sealing surface engages the cylinder wall, a pair of circumferentially offset sealing surfaces are defined by the projections and a sealing surface is defined between a side of the joint and a ring groove side. The same sealing surfaces are presented regardless of the direction of application of high pressure fluid. The joint construction provides a tortuous or labyrinth path to effectively prevent leakage or blow-by through the ring joint. The ring joint in accordance with the present invention is relatively easily and inexpensively manufactured and provides an effective one piece, concentric ring.

BRIEF DESCRIPTION OF THE DRAWINGS

FIG. 1 is a perspective view of a bi-directional sealing ring in accordance with the present invention;

FIG. 2 is an enlarged, elevational view of the gap area of the sealing ring of FIG. 1;

FIG. 3 is an end, elevational view as seen from line III—III of FIG. 2;

FIG. 4 is an end, elevational view as seen from line IV—IV of FIG. 2;

FIG. 5 is an enlarged, perspective view of the gap defined by the bi-directional ring in accordance with the present invention;

FIG. 6 is a cross-sectional, elevational view of the ring taken generally along line VI—VI of FIG. 1 with the ring positioned in a piston ring groove;

FIG. 7 is an enlarged, perspective view of a prior art bi-directional sealing ring;

FIG. 8 is an enlarged, perspective view of the gap of a prior art pressure sealing ring; and FIG. 9 is a cross-sectional view of a joint showing the sealing surfaces defined by the prior art ring of FIG. 8.

DETAILED DESCRIPTION OF THE PREFERRED EMBODIMENT

The preferred embodiment of the bi-directional piston ring in accordance with the present invention is illustrated in FIG. 1 and generally designated 10. The piston ring 10 is a one piece, concentric type compression piston ring which includes an annular, one piece body 12. The annular body 12 is parted to define a gap 14 when not compressed (FIG. 2) or an overlapping joint 16 when the ring is compressed (FIG. 1). The annular ring 12 includes a top side 18, a bottom side 20, an outer circumferential face 22 and an inner circumferential face 24. The ring body 12 is concentric about a central axis 23. As seen in FIG. 2, the annular body 12 defines opposed ends 26, 28 at the gap or part 14. The opposed ends 26 and 28 each include projections or projecting elements 30, 32, respectively.

As seen in FIGS. 2, 3 and 5, the projecting element 30 is generally stepped in side elevation and defines a sealing or wedge surface 34, a sealing or wedge surface 36 and axially or vertically extending surfaces 38, 40 and 42. The sealing surfaces or wedge surfaces 34, 36 are angularly related and are oppositely inclined about a radial plane extending through the midpoint between the top side 18 and the bottom side 20. Further, each of the sealing surfaces includes an outer circumferential edge portion 46, 48 respectively. The edge portions 46, 48 are vertically or axially offset. The axial surface 40, therefore, as seen in FIG. 3, has a generally truncated cone shape in elevation. The axial surface 38 and the axial surface 42 have triangular shapes in elevation. As seen in FIGS. 3 and 5, the sealing or wedging surfaces 34, 36 have inner circumferential edge portions 50, 52 which terminate short of or in spaced, parallel relationship with the intersection between the inner ring face of the upper and lower sides 18, 20 of the ring. The bottom side 20 at projection 30 defines a horizontal bearing or seal surface 53 between edge 52 and the lower edge of inner face 24.

As seen in FIGS. 2, 4 and 5, the projection or projecting element 32 of the end 28 is oppositely configured to and has a mating configuration with the projecting element 30 of end 26. Projecting element 32 defines circumferentially offset wedge or sealing surfaces 54, 56. The sealing surfaces 54, 56 are oppositely inclined with respect to a radial plane extending through the midpoint between the top and bottom sides 18, 20 of the ring. The projection 28 defines axial or vertical surfaces 58, 60 and 62. The wedge surface 56 and the vertical surface 62 extend circumferentially adjacent the bottom side 20 of the ring while the wedge or sealing surface 34 and vertical or axial surface 38 extend circumferentially adjacent the top side 18 of the ring. The sealing surfaces 54, 56 include outer circumferential edge portions 66, 68 which are axially offset as well as circumferentially offset. The inner circumferential face, edge portions 70, 72 of surfaces 54, 56 terminate short of the intersection between the inner circumferential face 24 of the ring and the top and bottom sides 18, 20. The top side 18 of the ring defines a bearing or sealing surface 73 between edge 70 and the upper or top edge of inner face 24. The sealing surfaces 34, 36 and 54, 56 are oppositely disposed with respect to each other. The sets of surfaces open in opposite directions although both sets are inclined and converge towards the outer circumferential face 22 of the ring.

A ring in accordance with the present invention can be manufactured in practically any size. It is preferred, however, for ease of manufacture, that the ring be at least two inches in diameter and have a width between the top and bottom sides of at least ⅛ inch. In a presently existing 2.895 inch outer diameter by ⅛ inch width piston ring in accordance with the preferred embodiment, the ring has a radial depth of approximately 0.10 inches, a width between the top and bottom sides of approximately 0.125 inches and the sealing surfaces are angled from horizontal at approximately 25°. The projecting elements 28, 30 have a circumferential length of approximately 0.120–0.140 inches and the sealing surfaces each have a circumferential length approximately one-half that of the projecting elements. The vertical or axial offset between the outer circumferential edges of the sealing surfaces is between 0.005 and 0.015 inches. The sealing surfaces 53 and 73 have a radial depth of between 0.005 and 0.015 inches.

As seen in FIG. 1, when the resilient ring body 12 is compressed so that the ends 26, 28 overlap, the surfaces 38, 58, 40, 60 and 42, 62 are colinear and act as abutment or stop surfaces. Sealing or wedge surface 36 sealingly engages and rides on sealing or wedge surface 56. Sealing or wedge surface 34 rides on and seals with sealing or wedge surface 54. The circumferentially dimensioning of the sealing or wedge surfaces are such that the projections overlap and provide joint or gap clearance to compensate for thermal expansion and contraction as well as cylinder wall tolerances.

As seen in FIG. 6, when the piston ring is installed in a piston groove 80 defined by piston 82, the ring joint defines a seal 84 which engages the cylinder wall, a seal 86 and a seal 87 engaging the ring groove bottom side 88 and a pair of angularly related, inclined sealing surfaces defined by the mating or sealingly engaging surfaces 34, 54 and 36, 56. When fluid under high pressure is applied either to the top side or the bottom side of the ring, fluid may enter the ring groove and act behind the piston ring or against the inner circumferential face 24. A wedging action results between the oppositely inclined wedge or sealing surfaces which tends to lock the ends of the ring in place in a sideways lock-up. One end of the ring moves outward into engagement with the cylinder wall. Further, the angularly related sealing surfaces define a tortuous path or labyrinth type seal which effectively controls leakage past the ring joint in either direction.

The significant differences between the sealing ring joint or gap construction in accordance with the present invention and that of the prior art are readily apparent from a comparison of FIGS. 1, 6 and FIGS. 7, 8 and 9. In FIG. 7, a prior art bi-directional sealing ring is illustrated. This sealing ring includes a pair of end projections 92, 94. The end projections 92, 94 define radially extending or horizontal sealing surface 96, 98, respectively. An element 100 on end 94 includes a horizontal lower sealing surface which seals with and rests on sealing surface 96 when the joint or gap is closed. The sealing surface 98 sealingly engages the undersurface of the projection 102 on end 92. The sealing surfaces defined by the joint are generally horizontal and do not provide a tortuous path as is provided by the joint in accordance with the present invention. While the projecting portions 100, 102 of the ring of FIG. 7 in effect lock the rings together when the gap is closed, the wedging surfaces or sealing surfaces of the present invention effectively bias a surface into engagement with the cylinder wall and at the same time provide a significant improvement in the blow-by effectiveness or sealing effectiveness when compared with prior bi-directional joints.

The advantages of the bi-directional joint in accordance with the present invention are also readily apparent from a comparison with the prior art high pressure seal joint discussed above and illustrated in FIGS. 8 and 9. With this type of seal joint, the ends 106, 108 of the ring include projecting portions 110 and 112 each having a single, oppositely inclined sealing surface 114, 116, respectively. As seen in FIG. 9, the sealing surfaces 114, 116 ride on each other. This high pressure type sealing ring does not provide bi-directional capability nor does it provide the wedging action which results from the overlapping bi-directional joint in accordance with the present invention. The joint of FIG. 9 provides only a single sealing surface between the overlapping portions of the end of the ring. Neither of the types of sealing rings shown in FIGS. 7-9 provide the tortuous or labyrinth type path which effectively seals the high pressure fluids as does the present invention. The wedging or sealing surfaces of the present invention are in effect oppositely inclined ramps. The high pressure fluid effectively locks the ends of the ring due to the opposite inclination of these ramps or wedging surfaces. This angling of the surfaces also increases the effective sealing due in part to an increase in the surface sealing area when compared to the prior art sealing rings shown in FIGS. 7-9 and due to the tortuous paths defined by the joint.

The ring in accordance with the present invention is easily and relatively inexpensively manufactured using conventional techniques. A conventionally cast, parted ring body may be fabricated with the joint by grinding the sides of the body, rough milling the gap, rough turning the body, rough boring and then milling the joint surfaces with an end mill. This step may involve cutting one of the angled surfaces, turning the ring over to cut the surface on the opposite end. Using the same fixture and angle setting, the joint is moved 180° on the fixture and remaining angled surfaces are cut on each end. The ring body may then be finish turned and bored.

It should now be readily apparent to those of ordinary skill in the art that the unique bi-directional joint piston ring in accordance with the present invention provides an effective seal to prevent or substantially eliminate leakage of high pressure fluid. The one piece, concentric compression ring is usable in a wide variety of applications. For example, the ring is usable in hydraulic rams of the double or single acting type, compressors and internal combustion engines, in particular diesel engines. The piston ring is readily and easily manufactured employing conventional piston ring manufacturing techniques. The angularly and oppositely related sealing or wedge surfaces are easily formed in the ends of the parted annular ring body. The overlapping bi-directional joint provides multiple and angularly related sealing surfaces which produce significant advantages when compared to the prior art.

In view of the foregoing description, those of ordinary skill in the art will undoubtedly envision various modifications which would not depart from the inventive concepts disclosed herein. Therefore, it is expressly intended that the above description should be considered as that of the preferred embodiment. The true spirit and scope of the present invention will be determined by reference to the appended claims.

The embodiments of the invention in which an exclusive property or privilege is claimed are defined as follows.

1. A sealing ring including inner and outer faces, upper and lower sides and having a bi-directional ring gap, said ring having a parted annular body; said body at its part having an overlapping joint characterized by a pair of circumferentially projected elements defining circumferentially offset oppositely facing wedge surfaces on each of the ring body at said part; said wedge surfaces each having inner and outer edge portions extending circumferentially of said ring, said wedge surfaces on each end of said ring body being inclined so as to converge toward the outer circumferential face of said ring; said wedge surfaces of each end of said ring body at the outer circumferential face of said ring being spaced apart axially of said ring with the wedge surfaces on one end of said ring body seating against and forming a seal with the oppositely facing wedge surfaces on the other end of said ring body when the gap in said ring is closed, said wedge surfaces extending radially of said ring, a wedge surface on each of said projections terminating short of the inner face to define a bearing surface, and the circumferentially projecting elements formed on each end of said ring body providing a joint having offset steps therein between the top and bottom sides of said ring.

2. A sealing ring as described in claim 1 further characterized in that the joint formed by said wedge surfaces is symmetrical about a radially extending plane midway between the upper and lower sides of said body.

3. An improved joint construction for a pressure ring, the pressure ring being of the type including an annular parted body having top and bottom sides, inner and outer faces and opposed ends, said improved joint comprising:

each end of said body defining a projection, each of said projections defining a pair of oppositely inclined sealing surfaces, the sealing surfaces defined by one of said projections facing oppositely to the sealing surfaces of the other of said projections, said projections overlapping and the sealing surfaces defined by one of said projections seating against the sealing surfaces of the other of said projections, the sealing surfaces defined by each of said projections being circumferentially offset relative to each other, and extending radially between the inner face and the outer face of said body, the outer circumferential edge portions of said sealing surfaces of each of said projections being offset axially of said body, and one of the sealing surfaces of each of said projections including an inner circumferential edge portion which terminates in spaced relationship with the inner circumferential edge of one of said top and bottom sides to thereby define a horizontal bearing surface.

4. An improved joint construction as defined by claim 3 wherein said sealing surfaces of each of said projections are equally and oppositely angled with respect to a radially extending plane midway between the upper and lower sides of said ring.

5. An improved joint construction as defined by claim 4 wherein said sealing surfaces of each of said projections are equally and oppositely angled with respect to a radially extending plane midway between the upper and lower sides of said ring.

6. An improved joint construction as defined by claim 5 wherein each of said projections define axially extending surfaces between said sealing surfaces and said axially extending surfaces are generally perpendicular to said top and bottom sides.

7. An improved joint construction as defined by claim 6 wherein said overlapping projections are symmetrical about a radially extending plane located midway between the upper and lower sides of said body.

* * * * *